US012749176B2

(12) United States Patent
Kaminsky et al.

(10) Patent No.: US 12,749,176 B2
(45) Date of Patent: Sep. 29, 2026

(54) FOURIER TRANSFORM BASED MACHINE LEARNING FOR DEFECT EXAMINATION OF SEMICONDUCTOR SPECIMENS

(71) Applicant: Applied Materials Israel Ltd., Rehovot (IL)

(72) Inventors: Eli Kaminsky, Rehovot (IL); Yulia Krasilshchikov, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 264 days.

(21) Appl. No.: 18/389,710

(22) Filed: Dec. 19, 2023

(65) Prior Publication Data

US 2025/0200741 A1 Jun. 19, 2025

(51) Int. Cl.

| | |
|---|---|
| ***G06V 10/10*** | (2022.01) |
| ***G06F 18/213*** | (2023.01) |
| ***G06T 7/00*** | (2017.01) |
| ***G06V 10/70*** | (2022.01) |
| ***G06V 10/74*** | (2022.01) |
| ***G06V 10/764*** | (2022.01) |
| ***H10P 74/00*** | (2026.01) |

(52) U.S. Cl.

CPC .... *G06T 7/001* (2013.01); *G06T 2207/20081* (2013.01); *G06T 2207/20084* (2013.01); *G06T 2207/20224* (2013.01); *G06T 2207/30148* (2013.01)

(58) Field of Classification Search

USPC ................ 382/141–159, 100–103, 190–299; 438/963–974, 1–15; 700/47–54, 78–81, 700/108–143; 706/1–62, 900–912

See application file for complete search history.

(56) References Cited

U.S. PATENT DOCUMENTS

2014/0270475 A1* 9/2014 Huang .................... G06T 7/001 382/149
2019/0073566 A1* 3/2019 Brauer .................. G06T 7/0002
2020/0226744 A1* 7/2020 Cohen ....................... G06T 7/11
2021/0383526 A1* 12/2021 Chen ...................... G06V 10/82
2022/0050061 A1* 2/2022 Bar .................... G01N 21/9501
2024/0078659 A1* 3/2024 Ofir ........................... G06T 5/70

OTHER PUBLICATIONS

Bergmann Paul; Method for Detecting Anomalies in Images Using a Plurality of Machine Learning Programs; 2023 (Year: 2023).*

* cited by examiner

*Primary Examiner* — Marcellus J Augustin

(74) *Attorney, Agent, or Firm* — Lowenstein Sandler LLP

(57) ABSTRACT

There is provided a system and method of defect examination on a semiconductor specimen. The method comprises obtaining an input image indicative of difference between an inspection image of the specimen and a corresponding reference image; and processing the input image using a trained machine learning (ML) system, to generate an output image representative of a defect map indicative of distribution of defect of interest (DOI) candidates in the input image. The ML system comprises a plurality of ML models operatively connected therebetween and previously trained together to perform defect detection on the input image based on Fourier transform. The output image is usable for further defect examination.

17 Claims, 5 Drawing Sheets

FOURIER TRANSFORM BASED MACHINE LEARNING FOR DEFECT EXAMINATION OF SEMICONDUCTOR SPECIMENS

TECHNICAL FIELD

The presently disclosed subject matter relates, in general, to the field of examination of a semiconductor specimen, and more specifically, to machine learning based defect detection on a specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Run-time examination can generally employ a two-phase procedure, e.g., inspection of a specimen followed by review of sampled locations of potential defects. Examination generally involves generating certain output (e.g., images, signals, etc.) for a specimen by directing light or electrons to the wafer, and detecting the light or electrons from the wafer. During the first phase, the surface of a specimen is inspected at high-speed and relatively low-resolution. Defect detection is typically performed by applying a defect detection algorithm to the inspection output. A defect map is produced to show suspected locations on the specimen having a high probability of being a defect. During the second phase, at least some of the suspected locations are more thoroughly analyzed with relatively high resolution, for determining different parameters of the defects, such as classes, thickness, roughness, size, and so on.

Examination can be provided by using non-destructive examination tools during or after manufacture of the specimen to be examined. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally, or alternatively, each examination step can be repeated multiple times, for example for different wafer locations, or for the same wafer locations with different examination settings.

Examination processes are used at various steps during semiconductor fabrication to detect and classify defects on specimens, as well as perform metrology related operations. Effectiveness of examination can be improved by automatization of process(es) such as, for example, defect detection, Automatic Defect Classification (ADC), Automatic Defect Review (ADR), image segmentation, automated metrology-related operations, etc.

Automated examination systems ensure that the parts manufactured meet the quality standards expected and provide useful information on adjustments that may be needed to the manufacturing tools, equipment, and/or compositions, depending on the type of defects identified.

In some cases, machine learning technologies can be used to assist the automated examination process so as to promote higher yield. For instance, supervised machine learning can be used to enable accurate and efficient solutions for automating specific examination applications based on sufficiently annotated training images.

SUMMARY

In accordance with certain aspects of the presently disclosed subject matter, there is provided a computerized system of runtime defect examination on a semiconductor specimen, the system comprising a processing circuitry configured to: obtain an input image indicative of difference between an inspection image of the specimen and a corresponding reference image; and process the input image using a trained machine learning (ML) system, to generate an output image representative of a defect map indicative of distribution of defect of interest (DOI) candidates in the input image, wherein the ML system comprises a plurality of ML models operatively connected therebetween and previously trained together to perform defect detection on the input image based on Fourier transform, and wherein the output image is usable for further defect examination.

In addition to the above features, the system according to this aspect of the presently disclosed subject matter can comprise one or more of features (i) to (viii) listed below, in any desired combination or permutation which is technically possible:

(i). The ML system can comprise a first ML model operatively connected to a second ML model and a third ML model in parallel. The first ML model is configured to generate one or more feature maps representative of the input image, and the second and third ML models are configured to process the one or more feature maps separately and generate, respectively, a real part and an imaginary part of a Fourier image corresponding to the input image.

(ii). The ML system further comprises an analytical model configured to perform inverse Fourier transform (IFT) on the Fourier image to reconstruct the output image.

(iii). The first ML model is an auto-encoder, and the second ML model and the third ML model are Convolutional Neural Networks (CNNs).

(iv). The ML system comprises a first ML model operatively connected to a second model. The first ML model is configured to generate one or more feature maps representative of the input image, and the second model is configured to process the one or more feature maps and reconstruct the output image.

(v). The ML system is trained to detect presence of a DOI in a training image based on a frequency response of a Fourier image corresponding to the training image and a ground truth frequency response of the DOI, and identify a location of the DOI in the training image based on the training image and a reconstructed image of the training image.

(vi). The processing circuitry is further configured to obtain a second input image indicative of difference between the inspection image and a second reference image; process the second input image using the trained ML system to obtain a second output image; and determining presence of DOI candidates based on the output image and the second output image.

(vii). The ML system comprises a classifier. The processing circuitry is further configured to use the classifier to process the output image to provide a classification score indicative of level of confidence of DOI presence in the output image, and determine DOI presence based on the output image and the classification score.

(viii). The input image is a difference image obtained by comparing the inspection image with the reference image. The output image has suppressed residual noises with respect to the input image, which when being used for further defect examination, improves detection sensitivity.

In accordance with other aspects of the presently disclosed subject matter, there is provided a computerized method of runtime defect examination on a semiconductor specimen, the method comprising: obtaining an input image indicative of difference between an inspection image of the specimen and a corresponding reference image; and processing the input image using a trained machine learning (ML) system, to generate an output image representative of a defect map indicative of distribution of defect of interest (DOI) candidates in the input image, wherein the ML system comprises a plurality of ML models operatively connected therebetween and previously trained together to perform defect detection on the input image based on Fourier transform, and wherein the output image is usable for further defect examination.

These aspects of the disclosed subject matter can comprise one or more of features (i) to (viii) listed above with respect to the system, mutatis mutandis, in any desired combination or permutation which is technically possible.

In accordance with other aspects of the presently disclosed subject matter, there is provided a computerized method of training a machine learning (ML) system usable for defect examination on a semiconductor specimen, the method comprising: obtaining a training set comprising a first subset of training images each comprising a DOI and a second subset of training images without any DOI, each training image indicative of difference between an inspection image of a specimen and a corresponding reference image, and being associated with a ground truth (GT) frequency response thereof in a Fourier domain; for each given training image in the training set, processing the given training image using the ML system, to generate a Fourier image of the given training image and a frequency response thereof; processing the Fourier image for inverse Fourier transform (IFT), thereby obtaining a reconstructed image; and optimizing the ML system using a loss function having two components: a first component based on the frequency response and a GT frequency response associated with the given training image, and a second component based on the reconstructed image and the given training image.

In accordance with other aspects of the presently disclosed subject matter, there is provided a computerized method of training a machine learning (ML) system usable for defect examination on a semiconductor specimen, the method comprising: obtaining a training set comprising a first subset of training images each comprising a DOI and a second subset of training images without any DOI, each training image indicative of a difference between an inspection image of a specimen and a corresponding reference image, and being associated with a ground truth (GT) frequency response thereof in a Fourier domain; for each given training image in the training set, processing the given training image using the ML system, to obtain a reconstructed image; processing the reconstructed image to generate a Fourier image of the given training image and a frequency response thereof; and optimizing the ML system using a loss function having two components: a first component based on the frequency response, and a GT frequency response associated with the given training image, and a second component based on the reconstructed image and the given training image.

In addition to the above features, these aspects of the presently disclosed subject matter can comprise one or more of features (ix) to (xvi) listed below, in any desired combination or permutation which is technically possible:

(ix). The first subset comprises at least one training image synthetically generated by implanting the DOI in a defect-free difference image.

(x). The ML system comprises: a first ML model configured to, for each given training image, generate one or more feature maps representative of the given training image; a second ML model and a third ML model configured to process the one or more feature maps separately, and generate, respectively, a real part and an imaginary part of a Fourier image corresponding to the given training image; and an analytical model configured to perform the IFT based on the Fourier image to obtain the reconstructed image.

(xi). The optimization using the first loss component renders the second and third ML models to learn to generate the Fourier image with a frequency response close to the GT frequency response, which in turn leads the first ML model to learn to extract the one or more feature maps more related to DOI presence, while suppressing noises in the given training image.

(xii). The second loss component is a reconstruction loss representing a difference between the reconstructed image and defect information of the given training image, and the optimization using the second loss component enables the ML system to identify a location of DOI presence in the given training image.

(xiii). The ground truth frequency response is one of: Gaussian response, delta response, cylindrical response, and rectangular response, depending on the type of DOI.

(xiv). The analytical model is configured to perform the IFT to generate a complex image comprising a real part representing the reconstructed image, and an imaginary part. The analytical model is further configured to control a weight assigned to the imaginary part, so as to introduce uncertainty of DOI presence in the reconstructed image.

(xv). The method further comprises processing the reconstructed image using the ML system to provide a classification score indicative of level of confidence of DOI presence in the reconstructed image, and optimizing the ML system using a classification loss function based on the training image and the classification score.

(xvi). The ML system comprises a first ML model configured to generate one or more feature maps representative of the given training image, a second model configured to generate a reconstructed image based on the one or more feature maps, and an analytical model configured to perform Fourier transform based on the reconstructed image.

In accordance with other aspects of the presently disclosed subject matter, there is provided a non-transitory computer readable medium comprising instructions that, when executed by a computer, cause the computer to perform method steps of any of the above methods.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
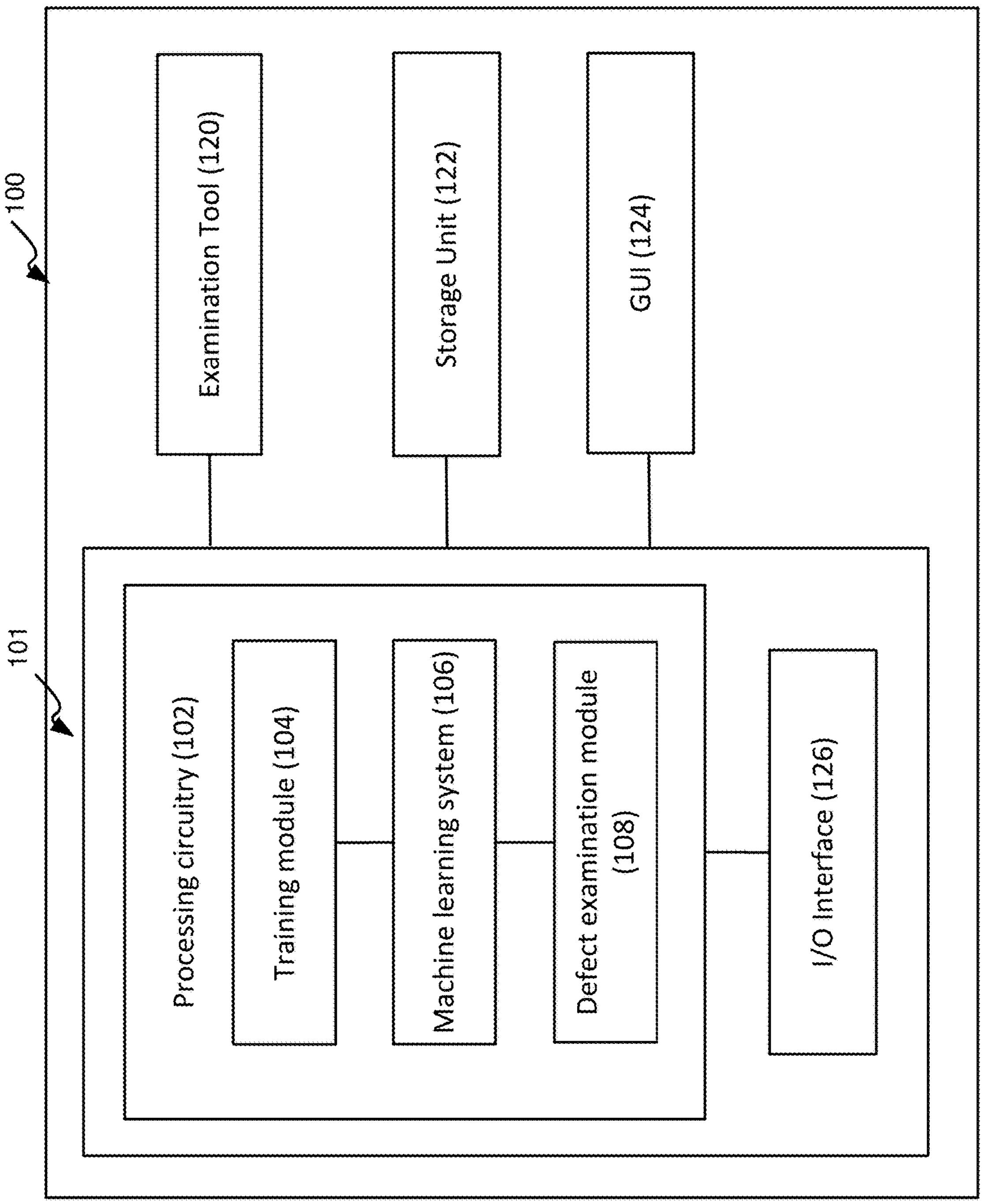
FIG. 1 illustrates a generalized block diagram of an examination system in accordance with certain embodiments of the presently disclosed subject matter.

The process of semiconductor manufacturing often requires multiple sequential processing steps and/or layers, each one of which could possibly cause errors that may lead to yield loss. Examples of various processing steps can include lithography, etching, depositing, planarization, growth (such as, e.g., epitaxial growth), and implantation, etc. Various examination operations, such as defect-related examination (e.g., defect detection, defect review, and defect classification, etc.), and/or metrology-related examination (e.g., critical dimension (CD) measurements, etc.), can be performed at different processing steps/layers during the manufacturing process to monitor and control the process. The examination operations can be performed a multiplicity of times, for example after certain processing steps, and/or after the manufacturing of certain layers, or the like.

As described above, defect examination can generally employ a two-phase procedure, e.g., inspection of a specimen followed by review of sampled locations of potential defects. During the first phase, the surface of a specimen is inspected at high-speed and relatively low-resolution. Defect detection is typically performed by applying a defect detection algorithm to the inspection output. Various detection algorithms can be used for detecting defects on specimens, such as Die-to-Die (D2D), Die-to-History (D2H), Die-to-Database (D2DB), etc.

By way of example, a classic die-to-reference detection algorithm, such as, e.g., Die-to-Die (D2D), is typically used in some cases. In D2D, an inspection image of a target die is captured. For purpose of detecting defects in the inspection image, one or more reference images are captured from one or more reference dies (e.g., one or more neighboring dies) of the target die. The inspection image and the reference images are aligned and compared to each other. One or more difference images (and/or derivatives thereof, such as grade images) can be generated based on the difference between pixel values of the inspection image, and pixel values derived from the one or more reference images. A detection threshold is then applied to the difference maps, and a defect map indicative of defect candidates in the target die is created.

Oftentimes, different variations between the inspection image and the reference image may be caused by physical effects of the fabrication process and/or examination process of the specimen, resulting in false alarms and random noises in the difference images and/or defect maps. Examples of such variations include process variations, and color variations, etc. Process variation refers to variations caused by a change in the fabrication process of the specimen. By way of example, the fabrication process may cause slight shifting/scaling/distortion of certain structures/patterns which results in pattern variations between different images such as the inspection and reference images. By way of another example, the fabrication process may cause thickness variation of the specimen, which affects reflectivity, thus in turn affecting gray level of the resulting inspection images. For instance, die-to-die material thickness variation can result in a different reflectivity between two of the dies, which leads to a different background gray level value for the images of the two dies. Color variation can be caused by process variation and/or by inspection tool(s) used for inspecting the specimen. By way of example, changes and/or calibrations in an inspection tool, such as different settings of the inspection tool (e.g., optical mode, detector, etc.) can cause gray level difference in different inspection images. Color variation can occur within a single image (e.g., due to layer thickness variations) or between inspection and reference images.

In some cases, image pre-processing technologies can be applied to the inspection image and reference image for reducing the effects of these variations. However, these variations typically cannot be entirely eliminated, thus leaving the residual variations and noises remaining in the difference images and/or defect maps, which affects defect detection sensitivity, thus degrading detection performance.

As semiconductor fabrication processes continue to advance, semiconductor devices are developed with increasingly complex structures with shrinking feature dimensions, which makes it more challenging for conventional detection methodologies to provide satisfying examination performance.

Accordingly, certain embodiments of the presently disclosed subject matter propose to use a machine-learning based defect examination system, which does not have one or more of the disadvantages described above. The present disclosure proposes to process an input image, such as a difference image, using a trained machine learning (ML) system, and generate an output image representative of a defect map indicative of distribution of defect of interest (DOI) candidates in the input image. The proposed runtime examination system can generate an output image with significantly reduced residual noises and variations, thereby improving defect detection sensitivity. The ML model is constructed and trained in a specific manner, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect classification, segmentation, and/or metrology operations, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes, including, by way of non-limiting example, scanning (in a single or in multiple scans), imaging, sampling, reviewing, measuring, classifying, and/or other processes provided with regard to the specimen or parts thereof. Without limiting the scope of the disclosure in any way, it should also be noted that the examination tools 120 can be implemented as inspection machines of various types, such as optical inspection machines, electron beam inspection machines (e.g., a Scanning Electron Microscope (SEM), an Atomic Force Microscopy (AFM), or a Transmission Electron Microscope (TEM), etc.), and so on.

The one or more examination tools 120 can include one or more inspection tools and/or one or more review tools. In some cases, at least one of the examination tools 120 can be an inspection tool configured to scan a specimen (e.g., an entire wafer, an entire die, or portions thereof) to capture inspection images (typically, at a relatively high-speed and/or low-resolution) for detection of potential defects (i.e., defect candidates). During inspection, the wafer can move at a step size relative to the detector of the inspection tool (or the wafer and the tool can move in opposite directions relative to each other) during the exposure, and the wafer can be scanned step-by-step along swaths of the wafer by the inspection tool, where the inspection tool images a part/portion (within a swath) of the specimen at a time. By way of example, the inspection tool can be an optical inspection tool. At each step, light can be detected from a rectangular portion of the wafer and such detected light is converted into multiple intensity values at multiple points in the portion, thereby forming an image corresponding to the part/portion of the wafer. For instance, in optical inspection, an array of parallel laser beams can scan the surface of a wafer along the swaths. The swaths are laid down in parallel rows/columns contiguous to one another, to build up, swath-at-a-time, an image of the surface of the wafer. For instance, the tool can scan a wafer along a swath from up to down, then switch to the next swath and scan it from down to up, and so on and so forth, until the entire wafer is scanned and inspection images of the wafer are collected.

In some cases, at least one of the examination tools 120 can be a review tool, which is configured to capture review images of at least some of the defect candidates detected by inspection tools for ascertaining whether a defect candidate is indeed a defect of interest (DOI). Such a review tool is usually configured to inspect fragments of a specimen, one at a time (typically, at a relatively low-speed and/or high-resolution). By way of example, the review tool can be an electron beam tool, such as, e.g., scanning electron microscopy (SEM), etc. An SEM is a type of electron microscope that produces images of a specimen by scanning the specimen with a focused beam of electrons. The electrons interact with atoms in the specimen, producing various signals that contain information on the surface topography and/or composition of the specimen. An SEM is capable of accurately inspecting and measuring features during the manufacture of semiconductor wafers.

The inspection tool and review tool can be different tools located at the same or at different locations, or a single tool operated in two different modes. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools. In some cases, at least one of the examination tools 120 has metrology capabilities and can be configured to capture images and perform metrology operations on the captured images. Such an examination tool is also referred to as a metrology tool.

According to certain embodiments of the presently disclosed subject matter, the examination system 100 comprises a computer-based system 101 operatively connected to the examination tools 120 and capable of automatic defect detection on a semiconductor specimen in runtime based on runtime images obtained during specimen fabrication. System 101 is also referred to as a defect detection system.

System 101 includes a processing circuitry 102 operatively connected to a hardware-based I/O interface 126 and configured to provide processing necessary for operating the system, as further detailed with reference to FIGS. 2-5. The processing circuitry 102 can comprise one or more processors (not shown separately) and one or more memories (not shown separately). The one or more processors of the processing circuitry 102 can be configured to, either separately or in any appropriate combination, execute several functional modules in accordance with computer-readable instructions implemented on a non-transitory computer-readable memory comprised in the processing circuitry. Such functional modules are referred to hereinafter as comprised in the processing circuitry.

The one or more processors referred to herein can represent one or more general-purpose processing devices such as a microprocessor, a central processing unit, or the like. More particularly, a given processor may be one of a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The one or more processors may also be one or more special-purpose processing devices such as an application specific integrated circuit (ASIC), a field programmable gate array (FPGA), a digital signal processor (DSP), a network processor, or the like. The one or more processors are configured to execute instructions for performing the operations and steps discussed herein.

The memories referred to herein can comprise one or more of the following: internal memory, such as, e.g., processor registers and cache, etc., main memory such as, e.g., read-only memory (ROM), flash memory, dynamic random access memory (DRAM) such as synchronous DRAM (SDRAM) or Rambus DRAM (RDRAM), etc.

According to certain embodiments of the presently disclosed subject matter, system 101 can be a runtime defect detection system configured to perform defect detection operations using a trained machine learning (ML) system based on runtime images obtained during specimen fabrication. In such cases, one or more functional modules comprised in the processing circuitry 102 of system 101 can include a ML system 106 that was previously trained for defect detection during a training/setup phase, and optionally a defect examination module 108.

Specifically, the processing circuitry 102 can be configured to obtain, via an I/O interface 126, an input image indicative of the difference between an inspection image of the specimen (as acquired by an examination tool in runtime) and a corresponding reference image, and provide the input image as an input to a machine learning system (e.g., the ML system 106) to process. The ML system 106 can generate an output image representative of a defect map indicative of distribution of defect of interest (DOI) candidates in the input image. The ML system 106 has been previously trained during a setup/training phase using a training set. Specifically, the ML system comprises a plurality of ML models operatively connected therebetween and previously trained together to perform defect detection on the input image based on Fourier transform. In some cases, the optional defect examination module 108 can be configured to perform further defect examination on the output image, such as, e.g., further nuisance filtration, defect review, defect classification, etc.

In such cases, the ML system 106 and defect examination module 108 can be regarded as part of a defect examination recipe usable for performing runtime defect examination operations on acquired runtime images. System 101 can be regarded as a runtime defect examination system capable of performing runtime defect-related operations using the defect examination recipe. Details of the runtime examination process are described below with reference to FIGS. 4-5.

In some embodiments, system 101 can be configured as a training system capable of training the ML model during a training/setup phase using a specific training set. In such cases, one or more functional modules comprised in the processing circuitry 102 of system 101 can include a training module 104 and a ML system 106 to be trained. Specifically, the training module 104 can be configured to obtain a training set comprising a first subset of training images each comprising a DOI and a second subset of training images without any DOI. Each training image is indicative of a difference between an inspection image of a specimen and a corresponding reference image, and associated with a ground truth (GT) frequency response thereof in a Fourier domain.

The training module 104 can be configured to train the ML system 106 using the training set. Specifically, for each training image in the training set, the ML system can be configured to process the training image to generate a transformed Fourier image of the training image and a frequency response thereof. The transformed Fourier image can be processed for inverse Fourier transform (IFT), thereby obtaining a reconstructed image. The ML system can be optimized using a loss function having two components: a first component based on the frequency response and a GT frequency response associated with the training image, and a second component based on the reconstructed image and the training image.

As described above, the ML system, upon being trained, is usable for defect detection in runtime. Details of the training process are described below with reference to FIGS. 2-3 and 6-7.

Operation of systems 100 and 101, the processing circuitry 102, and the functional modules therein will be further detailed with reference to FIGS. 2-5.

According to certain embodiments, the ML system 106 can comprise a plurality of ML models operatively connected with each other. The ML models referred to herein can be implemented as various types of machine learning models. By way of example, the ML models can be implemented as one of the following: Support Vector Machine (SVM), neural network, Bayesian network, transformers, and/or ensembles/combinations thereof. The learning algorithms used by the ML models can be any of the following: supervised learning, unsupervised learning, self-supervised, or semi-supervised learning, etc. The presently disclosed subject matter is not limited to the specific types of the ML models or the specific types of learning algorithms used by the ML models.

In some embodiments, the ML models can be implemented as a deep neural network (DNN). DNN can comprise multiple layers organized in accordance with respective DNN architecture. By way of non-limiting example, the layers of DNN can be organized in accordance with architecture of Convolutional Neural Network (CNN), Recurrent Neural Network, Recursive Neural Networks, autoencoder, Generative Adversarial Network (GAN), or otherwise. Optionally, at least some of the layers can be organized into a plurality of DNN sub-networks. Each layer of DNN can include multiple basic computational elements (CE) typically referred to in the art as dimensions, neurons, or nodes.

The weighting and/or threshold values associated with the CEs of a deep neural network and the connections thereof can be initially selected prior to training, and can be further iteratively adjusted or modified during training to achieve an optimal set of weighting and/or threshold values in a trained DNN. After each iteration, a difference can be determined between the actual output produced by DNN module and the target output associated with the respective training set of data. The difference can be referred to as an error value. Training can be determined to be complete when a loss/cost function indicative of the error value is less than a predetermined value, or when a limited change in performance between iterations is achieved. A set of input data used to adjust the weights/thresholds of a deep neural network is referred to as a training set.

It is noted that the teachings of the presently disclosed subject matter are not bound by specific architecture of the ML models or DNN as described above.

It is to be noted that while certain embodiments of the present disclosure refer to the processing circuitry 102 being configured to perform the above recited operations, the functionalities/operations of the aforementioned functional modules can be performed by the one or more processors in processing circuitry 102 in various ways. By way of example, the operations of each functional module can be performed by a specific processor, or by a combination of processors. The operations of the various functional modules, such as processing the input image, and performing defect examination, etc., can thus be performed by respective processors (or processor combinations) in the processing circuitry 102, while, optionally, these operations may be performed by the same processor. The present disclosure should not be limited to being construed as one single processor always performing all the operations.

In some cases, additionally to system 101, the examination system 100 can comprise one or more examination modules, such as, e.g., defect detection module, nuisance filtration module, Automatic Defect Review Module (ADR), Automatic Defect Classification Module (ADC), metrology operation module, and/or other examination modules which are usable for examination of a semiconductor specimen. The one or more examination modules can be implemented as stand-alone computers, or their functionalities (or at least part thereof) can be integrated with the examination tool 120. In some cases, the output of system 101, e.g., the trained ML system, the generated output image, and/or the defect examination result, can be provided to the one or more examination modules (such as the ADR, ADC, etc.) for further processing.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120, such as, e.g., the runtime input images, the training set, as described above. Accordingly, these input data can be retrieved from the storage unit 122 and provided to the processing circuitry 102 for further processing. The output of the system 101, such as, e.g., the trained ML system, the generated output image, and/or the defect examination result, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including the images of the specimen, etc. The user may be provided, through the GUI, with options of defining certain operation parameters. The user may also view the operation results or intermediate processing results, such as, e.g., the generated output image, and/or the defect examination result, etc., on the GUI.

In some cases, system 101 can be further configured to send, via I/O interface 126, the operation results to the examination tool 120 for further processing. In some cases, system 101 can be further configured to send the results to the storage unit 122, and/or external systems (e.g., Yield Management System (YMS) of a fabrication plant (fab)). A yield management system (YMS) in the context of semiconductor manufacturing is a data management, analysis, and tool system that collects data from the fab, especially during manufacturing ramp ups, and helps engineers find ways to improve yield. YMS helps semiconductor manufacturers and fabs manage high volumes of production analysis with fewer engineers. These systems analyze the yield data and generate reports. YMS can be used by Integrated Device Manufacturers (IMD), fabs, fabless semiconductor companies, and Outsourced Semiconductor Assembly and Test (OSAT).

Those versed in the art will readily appreciate that the teachings of the presently disclosed subject matter are not bound by the system illustrated in FIG. 1. Each system component and module in FIG. 1 can be made up of any combination of software, hardware, and/or firmware, as relevant, executed on a suitable device or devices, which perform the functions as defined and explained herein. Equivalent and/or modified functionality, as described with respect to each system component and module, can be consolidated or divided in another manner. Thus, in some embodiments of the presently disclosed subject matter, the system may include fewer, more, modified and/or different components, modules, and functions than those shown in FIG. 1.

Each component in FIG. 1 may represent a plurality of the particular components, which are adapted to independently and/or cooperatively operate to process various data and electrical inputs, and for enabling operations related to a computerized examination system. In some cases, multiple instances of a component may be utilized for reasons of performance, redundancy, and/or availability. Similarly, in some cases, multiple instances of a component may be utilized for reasons of functionality or application. For example, different portions of the particular functionality may be placed in different instances of the component.

It should be noted that the examination system illustrated in FIG. 1 can be implemented in a distributed computing environment, in which one or more of the aforementioned components and functional modules shown in FIG. 1 can be distributed over several local and/or remote devices. By way of example, the examination tool 120 and the system 101 can be located at the same entity (in some cases hosted by the same device) or distributed over different entities. By way of another example, as described above, in some cases, system 101 can be configured as a training system for training the ML model, while in some other cases, system 101 can be configured as a runtime defect detection system using the trained ML model. The training system and the runtime detection system can be located at the same entity (in some cases hosted by the same device), or distributed over different entities, depending on specific system configurations and implementation needs.

In some examples, certain components utilize a cloud implementation, e.g., implemented in a private or public cloud. Communication between the various components of the examination system, in cases where they are not located entirely in one location or in one physical entity, can be realized by any signaling system or communication components, modules, protocols, software languages, and drive signals, and can be wired and/or wireless, as appropriate.

It should be further noted that in some embodiments at least some of examination tools 120, storage unit 122 and/or GUI 124 can be external to the examination system 100 and operate in data communication with systems 100 and 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

While not necessarily so, the process of operations of systems 101 and 100 can correspond to some or all of the stages of the methods described with respect to FIGS. 2-5. Likewise, the methods described with respect to FIGS. 2-5 and their possible implementations can be implemented by systems 101 and 100. It is therefore noted that embodiments discussed in relation to the methods described with respect to FIGS. 2-5 can also be implemented, mutatis mutandis as various embodiments of systems 101 and 100, and vice versa.

Figure 2:
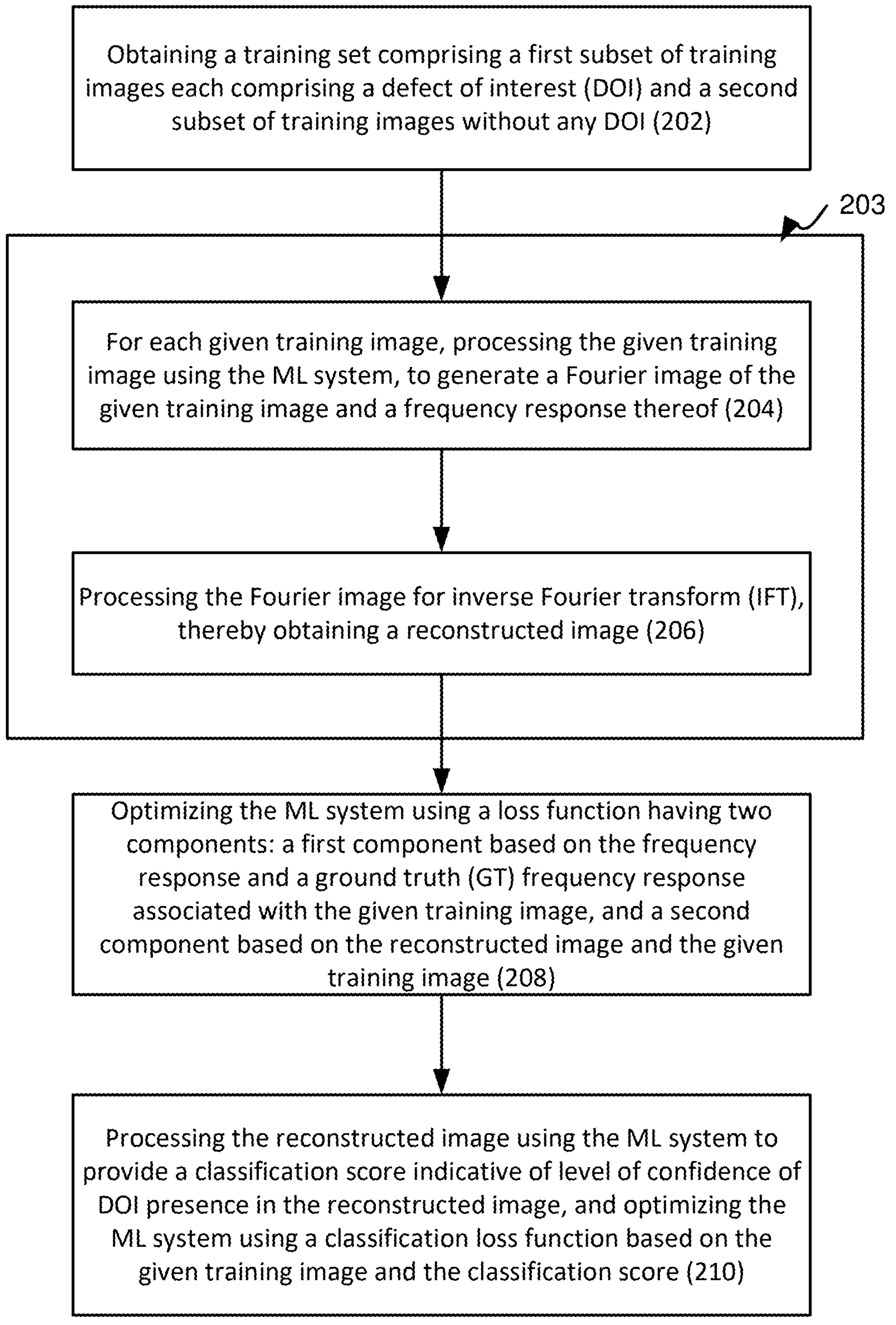
FIG. 2 illustrates a generalized flowchart of training a machine learning system usable for defect examination on a semiconductor specimen in accordance with certain embodiments of the presently disclosed subject matter.

Referring to FIG. 2, there is illustrated a generalized flowchart of training a machine learning system usable for defect examination on a semiconductor specimen in accordance with certain embodiments of the presently disclosed subject matter.

A training set can be obtained (202) (e.g., by the training module 104 in processing circuitry 102). The training set comprises a first subset of training images each comprising a defect of interest (DOI) and a second subset of training images without any DOI. A training image comprising a DOI can also be referred to as a defective training image, whereas a training image without any DOI can also be referred to as a defect-free training image, i.e., a clean image free of defective features. In some cases, a training image can be acquired as an image patch with a predefined size from an image block of an inspection image of a specimen, as acquired by an inspection tool.

Each training image in the training set can be indicative of a difference between an inspection image of a specimen and a corresponding reference image (the reference image corresponds to the inspection image in a sense that it captures a similar region containing similar patterns as those of the inspection image). By way of example, the training image can be a difference image, or a derivative thereof, resulting from comparison between pixel values of the inspection image and the reference image thereof. For instance, the difference image can be generated by subtracting the reference image from the inspection image. In some cases, a grade image, as a derivative of the difference image, can be generated by applying a predefined difference normalization factor on the difference image. The difference normalization factor can be determined based on behavior of a normal population of pixel values and can be used to normalize the pixel values of the difference image. By way of example, the grade of a pixel can be calculated as a ratio between a corresponding pixel value of the difference image and the predefined difference normalization factor. The difference image, or the grade image (or any further derivative thereof), can be used as the training image.

In some embodiments, some of the training images in the first subset and/or the second subset can be synthetic images generated by image simulation, in comparison to real images resulting from actual image acquisition by an examination tool (e.g., a real difference image obtained from comparison of actually acquired inspection image and reference image). By way of example, the first and/or second subset of training images can in some cases comprise only real images, or only synthetic images, or a combination of both types of images in any possible proportion. For instance, the first subset can comprise at least one defective training image synthetically generated by implanting a DOI in a difference image, where the difference image is a defect-free image that can be real or synthetic. Similarly, the second subset can comprise one or more real images and/or synthetic defect-free images. The present disclosure is not limited to the type or number of training images and/or the specific ways of acquiring/generating them.

According to certain embodiments, each training image in the training set is associated with a ground truth (GT) frequency response thereof in a Fourier domain. Fourier transform (FT) generally refers to a type of transform for converting a signal/function into a form that describes the frequencies present in the original signal/function (such as, e.g., decomposing a signal into a sum of sinusoids). The output of the transform is a complex function of frequency comprising a real part and an imaginary part of this function. FT is thus sometimes referred to as the frequency domain representation of the original function. When being used for image processing, Fourier transform can transform an image from spatial domain to frequency domain (also referred to herein as Fourier domain), and provide information on the frequency content of the image. The transformed image (also referred to herein as a Fourier image, or a transformed Fourier image) can be regarded as a complex image comprising a real part and an imaginary part, which together represent the distribution of energy of the image in the frequency domain.

FT can be performed to transform a training image to Fourier domain. By way of example, if the transformed Fourier image is represented by the complex function of: $F=Re+j*Im$, the frequency response (also referred to as power spectrum) of the transformed image can be represented by, e.g., $|F|$ or $|F|^2$, which represents a quantitative measure of the magnitude of the Fourier image. In cases where a training image comprises a DOI, the frequency response of a corresponding Fourier image thereof can be represented by various shapes of distributions, depending on the type of DOI.

Figure 6:
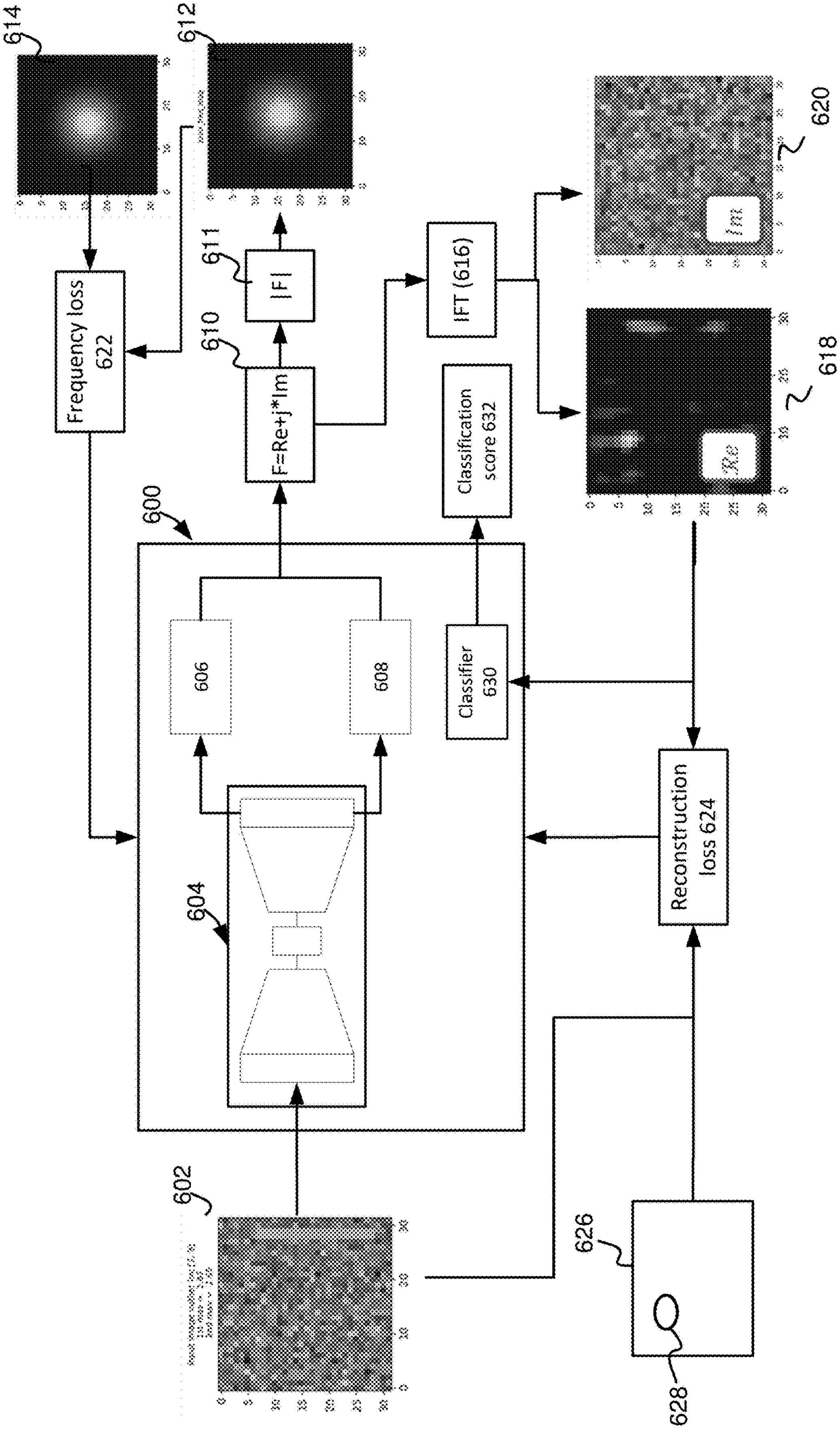
FIG. 6 shows a schematic illustration of a training process of the ML system in accordance with certain embodiments of the presently disclosed subject matter.

For instance, if the DOI in the spatial domain can be represented by a Gaussian distribution, the corresponding frequency response in the frequency domain of the training image can be represented as a Gaussian response, as exemplified in 614 in FIG. 6. The training image is thus associated with its frequency response in a Fourier domain as its ground truth (GT) (also referred to as ground truth feature response). In cases where a training image does not contain any DOI, the frequency response of a corresponding Fourier image thereof can be represented as a power spectrum of random noises.

In some embodiments, a defective training image in the first subset, irrespective of being real or synthetic, consists of a single DOI. This can be necessary because an image having a single DOI generally has a specific feature response of the corresponding Fourier image in the Fourier domain. For instance, the Gaussian response as exemplified in FIG. 6 corresponds to a training image consisting of a single DOI. In cases where there are multiple DOIs in a training image, the spectrum of the feature response is not deterministic, thus may be difficult to be used for identifying presence of a DOI.

It is to be noted that there may be other types of feature responses to be associated with different types of DOIs, such as, e.g., delta response, cylindrical response, rectangular response, etc., depending on the specific types of the DOIs.

Once the training set is obtained, for each given training image in the training set, the ML system can process (204) the given training image, to generate a Fourier image of the training image and a frequency response thereof. The ML system can comprise a plurality of ML models, operatively connected therebetween, which are trained together to perform defect detection on a given input image based on Fourier transform.

The ML system can be constructed in different ways. According to certain embodiments, the ML system comprises a first ML model operatively connected to a second ML model and a third ML model in parallel. For a given training image, the first ML model can be configured to generate one or more feature maps (e.g., tensors) representative of the training image. For purpose of mimicking the effects of Fourier transform, the second and third ML models are used in parallel to process the one or more feature maps separately, and generate, respectively, a real part and an imaginary part of a Fourier image in the Fourier domain corresponding to the training image.

An exemplified implementation of the aforementioned ML system is illustrated in block 600 of FIG. 6, which shows a schematic illustration of a training process of the ML system in accordance with certain embodiments of the presently disclosed subject matter. As shown, a training image 602 is fed into ML system 600. In the present example, the training image 602 is a synthetic defective image generated by implanting a DOI at a specific location in a defect-free difference image. As shown, the training image 602 is quite noisy, with random noises and residual patterns. The ML system 600 comprises a first ML model 604 operatively connected to a second ML model 606 and a third ML model 608 in parallel. By way of example, the first ML model 604 can be implemented as an auto-encoder (also written as autoencoder, or AE).

An autoencoder is a type of neural network commonly used for the purpose of data reproduction by learning efficient data coding and reconstructing its inputs (e.g., by minimizing the difference between the input and the output). An autoencoder typically has an input layer, an output layer, and one or more hidden layers connecting them. Generally, an autoencoder can be regarded as including two components, the encoder and the decoder. The autoencoder learns to encode data from an input layer into a short code (i.e., the encoder), and then decode that code into an output that closely matches the original data (i.e., the decoder component). The output of the encoder is referred to as code, latent variables, or latent representation in a latent space representative of the input image. The code can pass the hidden layers in the decoder and can be reconstructed to an output image corresponding to the input image in the output layer.

When an input image is processed through the layers in the autoencoder, certain layers of the encoder and the decoder can provide layer output in the form of, e.g., feature maps. For instance, in cases of an autoencoder with a convolutional encoder and decoder, the output of each layer can be represented as a 2D output feature map. The feature maps get smaller in size as they progress through the encoder, and get larger in size as they progress through the decoder. The output feature maps can be generated, e.g., by convolving each filter of a specific layer across the width and height of the input feature maps, and producing a two-dimensional activation map which gives the responses of that filter at every spatial position.

Stacking the activation maps for all filters along the depth dimension forms the full output feature maps of the specific layer, which can be represented as a 3D output feature map, with multiple channels, each corresponding to an activation map for a given filter. The 3D output feature map can also be regarded as multiple output feature maps corresponding to the multiple channels/filters. The output feature maps of each layer in the encoder and decoder can be used to represent the features that are being learned by the autoencoder.

In some embodiments, one or more output feature maps (also referred to herein as feature maps) from a given decoder layer of the first ML model 604 (e.g., an autoencoder) can be extracted and provided to the second ML model 606 and third ML model 608 to be processed. In order to realize the effects of Fourier transform and obtain an output of transformed Fourier image by machine learning, the second and third ML models are designed to be connected to the first ML model in parallel, and configured to process the one or more feature maps separately. The two ML models can generate, respectively, a real part and an imaginary part of a Fourier image in the Fourier domain corresponding to the training image.

By way of example, the second and third ML models can be implemented as CNN. For instance, an input of a 3D feature map can be processed by the deconvolutional layers of the second ML model or the third ML model to generate a 2D feature map. The 2D feature map generated by the second ML model 606 can represent the real part Re of a Fourier image, and the 2D feature map generated by the third ML model 608 can represent the imaginary part Im of the Fourier image. A complex Fourier image 610 can be represented in the form of: F=Re+j*Im.

A frequency response 612 of the Fourier image 610 can be obtained by, e.g., calculating the absolute value 611 of F, such as $|F|$ or $|F|^2$, based on the Fourier image 610, representing the magnitude of the Fourier image, as described above.

Continuing with the flow of FIG. 2, the Fourier image can be processed (206) for inverse Fourier transform (IFT), thereby obtaining a reconstructed image. The IFT refers to the reverse process of the Fourier Transform, which converts a signal/function from frequency domain to the original domain. It is used to recover the original signal from its frequency spectrum. In some embodiments, an analytical model can be used to perform IFT on the Fourier image to reconstruct the original image in spatial domain. The analytical model, although being a mathematical model rather than a learning-based model, can be regarded in some cases as being comprised in the ML system. As illustrated in FIG. 6, IFT 616 is applied on the Fourier image 610. Since IFT is a complex mathematical operation, a complex image in spatial domain is generated, including a real part 618 and an imaginary part 620. The real part 618 represents the reconstructed image, whereas the imaginary part 620 represents the phase of the reconstructed image.

The ML system can be optimized (208) (e.g., by the training module 104) using a loss function having two components: a first component based on the frequency response and a GT frequency response associated with the given training image, and a second component based on the reconstructed image and the given training image.

As illustrated in FIG. 6, the frequency response 612 of the Fourier image 610 can be evaluated with respect to the GT frequency response 614 based on the first component of a loss function, also termed as a frequency loss, such as the frequency loss 622 shown in FIG. 6. The ML system 600 can be optimized to reduce or minimize the frequency loss between the frequency response 612 and the GT frequency response 614, such that for a given training image, the ML system can learn to generate a GT response as close to the GT response as possible.

For instance, for a training image with a DOI (either original or implanted), its GT frequency response can be a Gaussian response as exemplified in 614. The output frequency response 612 as generated by the ML system can be compared with the GT frequency response 614, and the difference therebetween as represented by the frequency loss 622 can be minimized so as to optimize the parameters of the ML system. In cases where a training image is without any DOI, its GT frequency response can be random noise spectrum. By way of example, in cases where the training image is an image patch $I_{M*N}$, e.g., the jth patch of size M×N in a relatively larger difference image, the frequency loss can be represented as follows (F stands for the GT frequency response):

$$L_j = \left|F - \left|fft2\left(I^j_{M\times N}\right)\right|\right| \quad L_j = \left||\mathcal{F}| - \left|fft2\left(I^j_{M\times N}\right)\right|\right| \quad L_j = \left|1 - \left|fft2\left(I^j_{M\times N}\right)\right|\right|$$

Using the first loss component can render the ML system, specifically the second and third ML models in the example of FIG. 6, to learn to generate a transformed Fourier image with a frequency response close to the GT frequency response (such as the Gaussian response). This in turn can lead the first ML model to learn to extract feature maps more related to the DOI while suppressing any noises/nuisances in the training image.

In particular, in the first ML model, such as the autoencoder, the encoder of the network takes in the input and produces a lower dimensional representation of the input. The middle layer between the encoder and the decoder, i.e., the latent space layer, is regarded as the bottleneck layer. Such network architecture is designed for the purpose of deciding which aspects of observed data (e.g., feature maps representative of the input) are relevant information to pass on, and which aspects can be discarded. The autoencoder thus serves as a low-pass filter, which, when being trained in the presently disclosed ML system (e.g., by imposing the GT frequency response as described above), can learn to pass on features relevant to the DOI, while discarding/suppressing features related to noises/nuisances in the input image.

Having said the above, imposing the GT frequency response can only assist in detecting the presence of a DOI in the input image. It cannot identify the exact location of the DOI within the input image, as the frequency response in the Fourier domain stays the same as long as there is one DOI in the image. Therefore, a second loss component is needed for identifying the precise location of any DOI in the image.

As described above, the IFT 616 results in a complex image having a real part 618 and an imaginary part 620, where the real part 618 represents the reconstructed image. The reconstructed image is a reconstructed difference image corresponding to the input training image, which represents detected defect information. In some cases, the IFT is configured to control the weight assigned to the imaginary part, so as to introduce a certain level of uncertainty of the DOI presence in the reconstructed image. By way of example, the controllable weight can be tuned to "smear"/spread the energy in the reconstructed image to allow more than one DOI to be detected (in some cases it is possible that no DOI is detected).

The reconstructed image can be evaluated with respect to the input training image based on the second component of the loss function, also termed as reconstruction loss, such as the reconstruction loss 624 shown in FIG. 6. The reconstruction loss represents the difference between the reconstructed image and the actual defect information in the training image. The ML system can be optimized using the reconstruction loss based on the difference between the reconstructed image and the defect information in the training image.

For instance, in cases where the training image comprises a DOI, the defect information in the training image includes, e.g., the location of the DOI in the training image. The location of DOI can be regarded as a ground truth location of the DOI associated with the training image. As exemplified in FIG. 6, the training image 602 is a synthetic defective image having an implanted DOI at a specific location in the image. The defect information 626 of the given training image includes the ground truth location 628 of the implanted DOI. In cases where the training image is a defect-free image without any DOI, the defect information 626 would be represented as an image with random noises in the training image. In either cases, the ML system 600 can be optimized to reduce or minimize the reconstruction loss between the reconstructed image 618 and the defect information 626 of the training image, such that for a given training image, the ML system can learn to generate a reconstructed image as close to the GT defect information as possible. This enables the ML system to be able to identify the exact location of any DOI in the input image.

Using the loss function comprising both components as described above can enable the ML system to learn to not only detect the presence of a DOI, but also identify its exact location in the input image. In particular, the reconstructed image represents a much more cleaner difference image as compared to the input difference image, where the residual noises and patterns are removed and the DOI is present, as exemplified in the reconstruction image 618 in FIG. 6.

In some embodiments, optionally, the reconstructed image can be further processed (210) using the ML system, to provide a classification score indicative of level of confidence of DOI presence in the reconstructed image. The ML system can be further optimized using a classification loss function based on the training image and the classification score. As exemplified in FIG. 6, in such cases, the ML system 600 can further comprise a classifier 630. The reconstructed image 618 can be fed into the classifier 630 to be processed, and the classifier can output a classification score 632 indicating how confident the DOI(s) presented in the reconstruction image is a real defect. By way of example, the classification score can be represented in the form of a probability score.

During training, the classifier, as part of the ML system, can be optimized using a classification loss function based on the defect information of the training image (as ground truth) and the classification score. In some cases, the ML system, including all its learning components, such as the first, second, third ML models, and the classifier, can be optimized as a whole, using an overall loss function including the frequency loss, the reconstruction loss, and the classification loss.

According to certain further embodiments, the ML system can be constructed in an alternative manner. The ML system can comprise a first ML model operatively connected to a second ML model. For a given training image, the first ML model can be configured to generate one or more feature maps representative of the training image. The second model can be configured to generate a reconstructed image based on the one or more feature maps. The ML system can further comprise an analytical model configured to perform Fourier transform based on the reconstructed image.

Figure 3:
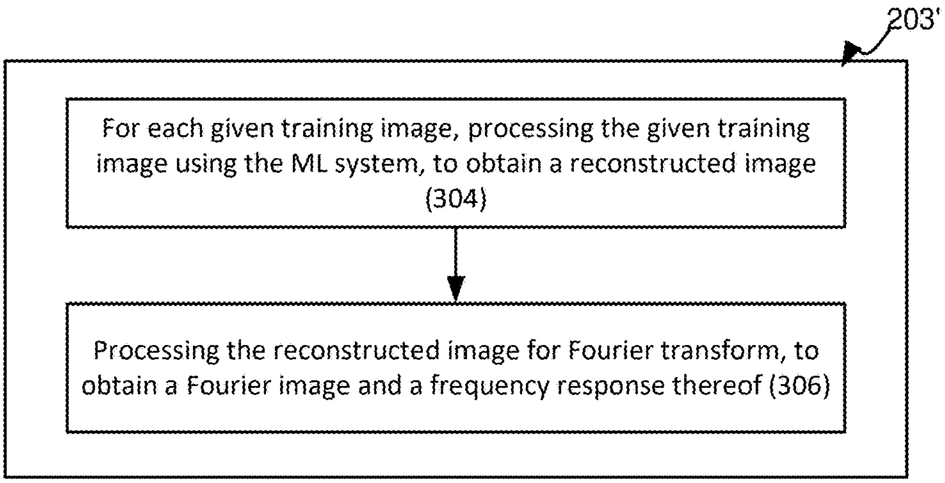
FIG. 3 illustrates a generalized flowchart of an adapted process of block 203 in an alternative ML system implementation in accordance with certain embodiments of the presently disclosed subject matter.

In such an alternative implementation, block 203 of FIG. 2 can be adapted accordingly. FIG. 3 illustrates a generalized flowchart of an adapted process of block 203 (i.e., block 203') in the alternative implementation in accordance with certain embodiments of the presently disclosed subject matter. Specifically, for each given training image in the training set, the ML system can process (304) the given training image, to generate a reconstructed image of the given training image. Specifically, as described above, the first ML model in the ML system can be configured to generate one or more feature maps representative of the training image. The second model can be configured to generate a reconstructed image based on the one or more feature maps. The reconstructed image can be processed (306) (e.g., by an analytical model) for Fourier transform, to obtain a Fourier image and a frequency response thereof. The process of blocks 304 and 306 constitute block 203' which replaces block 203 in the flow of FIG. 2 to be able to adapt to the alternative implementation.

Figure 7:
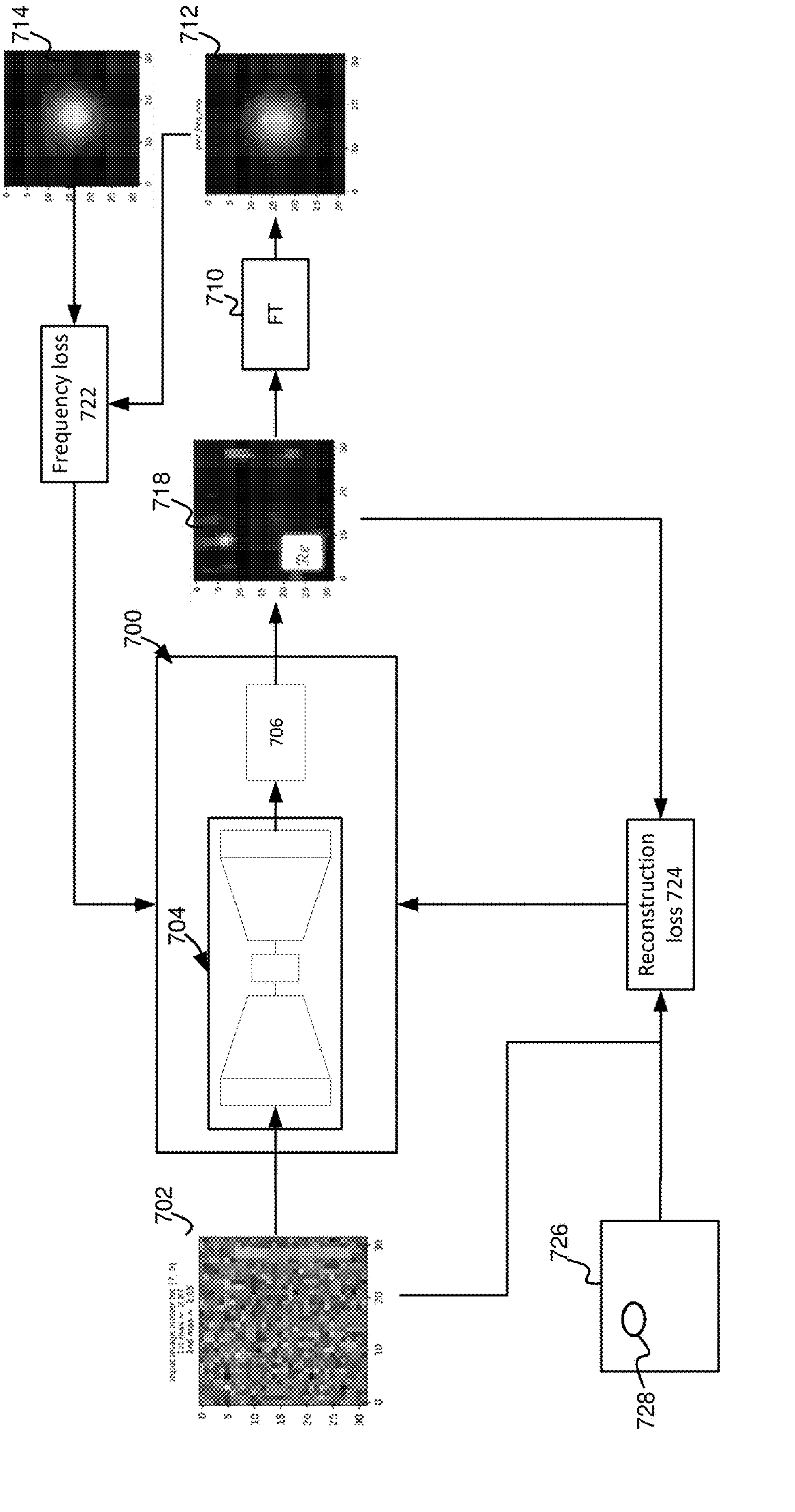
FIG. 7 shows a schematic illustration of a training process of the ML system with an alternative implementation in accordance with certain embodiments of the presently disclosed subject matter.

FIG. 7 illustrates an example of a ML system in such alternative implementation, as described below. Specifically, FIG. 7 shows a schematic illustration of a training process of the ML system comprising the first and second ML models in accordance with certain embodiments of the presently disclosed subject matter.

As shown, a training image 702 is fed into ML system 700. The training image 702 is the same as training image 602, which is a synthetic defective image generated by implanting a DOI at a specific location in a defect-free difference image. The ML system 700 comprises a first ML model 704 operatively connected to a second ML model 706. Similar to the ML model 604, the first ML model 704 can be implemented as an auto-encoder, as described above.

By way of example, one or more feature maps from a given decoder layer of the first ML model 704 (e.g., an autoencoder) can be extracted and provided to the second ML model 706 to be processed. In some cases, the second ML model can be implemented as CNN. For instance, a 3D feature map (or multi-channel feature maps) output by the first ML model can be fed as input to the second ML model. The second ML model can process it and generate a reconstructed image 718 corresponding to the training image 702. The reconstructed image is a reconstructed difference image, which represents detected defect information.

Next, the reconstructed image 718 can be processed in two paths. As illustrated in FIG. 7, it can be processed (e.g., by an analytical model) for Fourier transform 710, to obtain a Fourier image and a frequency response 712 thereof. The frequency response 712 of the Fourier image can be evaluated with respect to the GT frequency response 714 based on the first component of a loss function, such as the frequency loss 722 shown in FIG. 7. The ML system 700 can be optimized to reduce or minimize the frequency loss between the frequency response 712 and the GT frequency response 714, such that for a given training image, the ML system can learn to generate a reconstructed image whose Fourier transformed image has a frequency response as close to the GT response as possible.

On the other hand, the reconstructed image 718 can be evaluated with respect to the input training image 702 based on the second component of the loss function, such as the reconstruction loss 724 shown in FIG. 7. The reconstruction loss represents the difference between the reconstructed image and the actual defect information in the training image. As described above, in cases where the training image comprises a DOI, the defect information in the training image includes, e.g., the location of the DOI in the training image, which can be regarded as a ground truth location of the DOI associated with the training image.

As exemplified in FIG. 7, the training image 702 is a synthetic defective image having an implanted DOI at a specific location in the image. The defect information 726 of the given training image 702 includes the ground truth location 728 of the implanted DOI. The ML system 700 can be optimized to reduce or minimize the reconstruction loss between the reconstructed image 718 and the defect information 726 of the training image 702, such that for a given input image, the ML system can learn to generate a reconstructed image as close to the GT defect information as possible. This enables the ML system to be able to identify the exact location of any DOI in the input image.

Similarly, as described above with reference to block 210, in the alternative implementation it is also possible to further process the reconstructed image using the ML system, to provide a classification score indicative of level of confidence of DOI presence in the reconstructed image. The ML system can be further optimized using a classification loss function based on the training image and the classification score.

Figure 4:
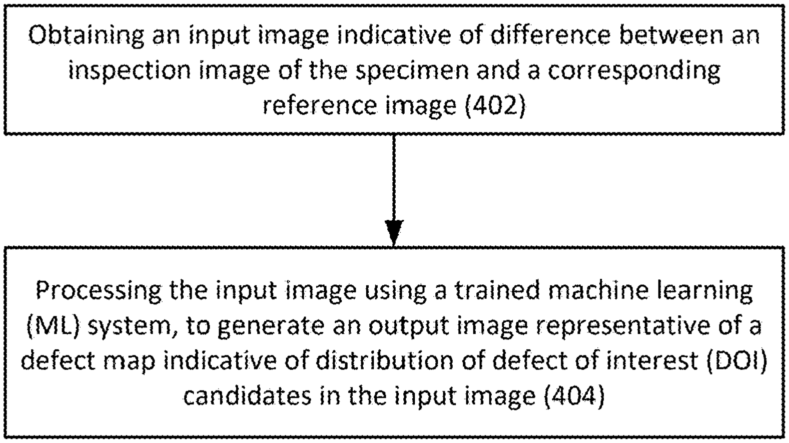
FIG. 4 illustrates a generalized flowchart of runtime defect examination on a semiconductor specimen using a trained ML system in accordance with certain embodiments of the presently disclosed subject matter.

Turning now to FIG. 4, there is illustrated a generalized flowchart of runtime defect examination on a semiconductor specimen using a trained ML system in accordance with certain embodiments of the presently disclosed subject matter.

As described above, a semiconductor specimen is typically made of multiple layers. The examination process of a specimen can be performed a multiplicity of times during the fabrication process of the specimen, for example following the processing steps of specific layers. In some cases, a sampled set of processing steps can be selected for in-line examination, based on their known impacts on device characteristics or yield. Images of the specimen or parts thereof can be acquired at the sampled set of processing steps to be examined.

For the purpose of illustration only, certain embodiments of the following description are described with respect to images of a given processing step/layer of the sampled set of processing steps. Those skilled in the art will readily appreciate that the teachings of the presently disclosed subject matter, such as the process of machine-learning based examination, can be performed following any layer and/or processing steps of the specimen. The present disclosure should not be limited to the number of layers comprised in the specimen and/or the specific layer(s) to be examined.

As illustrated in FIG. 4, an input image indicative of the difference between an inspection image of the specimen and a corresponding reference image can be obtained (402) (e.g., acquired by the examination tool 120) during runtime examination of the specimen. A semiconductor specimen here can refer to a semiconductor wafer, a die, or parts thereof, that is fabricated and examined in the fab during a fabrication process thereof. An inspection image of a specimen can refer to an image capturing at least part of the specimen to be examined by an inspection tool. By way of example, an inspection image can capture a target region or a target structure (e.g., a structural feature or pattern on a semiconductor specimen) that is of interest to be examined on a semiconductor specimen.

For each inspection image, one or more reference images can be used for defect detection. A reference image refers to a nominal/defect-free image that is free of defective features, or has a high probability of not comprising any defective features, such that it can be used as a reference for a corresponding inspection image for purpose of defect examination. The reference images can be obtained in various ways, and the number of reference images used herein and the way of obtaining such images should not be construed to limit the present disclosure in any way. In some cases, one or more reference images can be captured from one or more reference dies (e.g., neighboring dies of the inspection die) of the same specimen or a different specimen. In some cases, a reference image can be synthetically generated by image simulation. By way of example, a simulated image can be generated based on design data (e.g., CAD data) of a die or part thereof.

The inspection image and/or its reference image can be acquired using various inspection tools. For instance, the images can be electron beam (e-beam) images acquired by an electron beam tool, or optical images acquired by an optical inspection tool in runtime during in-line examination of the semiconductor specimen.

The runtime input image as described with reference to block 402 can be a difference image, or a derivative thereof, resulting from comparison between pixel values of the inspection image and the reference image thereof. The difference image can be generated in a similar manner as described above with reference to FIG. 2. For instance, the difference image can be generated by subtracting the reference image from the inspection image. In some cases, a grade image, as a derivative of the difference image, can be generated by applying a predefined difference normalization factor on the difference image. The difference normalization factor can be determined based on behavior of a normal population of pixel values, and can be used to normalize the pixel values of the difference image. By way of example, the grade of a pixel can be calculated as a ratio between a corresponding pixel value of the difference image and the predefined difference normalization factor. The difference image, or the grade image (or any further derivative thereof), can be used as the input image.

The runtime input image can be processed by a trained ML system (e.g., by the ML system 106) to generate (404) an output image representative of a defect map indicative of distribution of defect of interest (DOI) candidates in the input image. The ML system comprises a plurality of ML models operatively connected therebetween, which are previously trained together to perform defect detection on the input image based on Fourier transform. The ML system is previously trained during a training/setup phase, as described above with respect to FIGS. 2-3 and 6-7.

Specifically, the ML system can be constructed in different ways. In some embodiments, the ML system can comprise a first ML model operatively connected to a second ML model and a third ML model in parallel, as exemplified in FIG. 6. Upon being trained, the first ML model can be configured to generate one or more feature maps representative of the input image. The second and third ML models can be configured to process the one or more feature maps separately and generate, respectively, a real part and an imaginary part of a Fourier image corresponding to the input image. The ML system can further comprise an analytical model configured to perform inverse Fourier transform (IFT) on the Fourier image to reconstruct the output image.

The ML system is trained in such a way that the second ML model and the third ML model learn to generate a transformed Fourier image with a frequency response close to the GT frequency response (via the frequency loss), which in turn leads the first ML model, which acts like a low-pass filter, to learn to extract the feature maps more related to the DOI in a given input image while suppressing noises in the image. This enables the ML system, once being trained, to be able to detect the presence of a DOI in runtime input images. In addition, during training, the ML system also learns to identify a location of the DOI in an image (via the reconstruction loss). This enables the ML system to be able to identify the exact location of a DOI in runtime input images.

In some other embodiments, the ML system can comprise a first ML model operatively connected to a second model, as exemplified in FIG. 7. Upon being trained, the first ML model can be configured to generate one or more feature maps representative of the input image. The second model can be configured to process the one or more feature maps and reconstruct the output image.

The ML system is trained in such a way that the second ML model learns to generate a reconstructed image which presents the exact location of the DOI (via the reconstruction loss), while, when being transformed to a Fourier image, has a frequency response close to the GT frequency response (via the frequency loss).

A ML system constructed and trained as described above (in either embodiments) is capable of not only detecting DOI presence, but also identifying its exact location. The output image that is reconstructed by the ML system has reduced/suppressed residual noises with respect to the input image, which, when being used for defect detection, significantly improves detection sensitivity.

Figure 5:
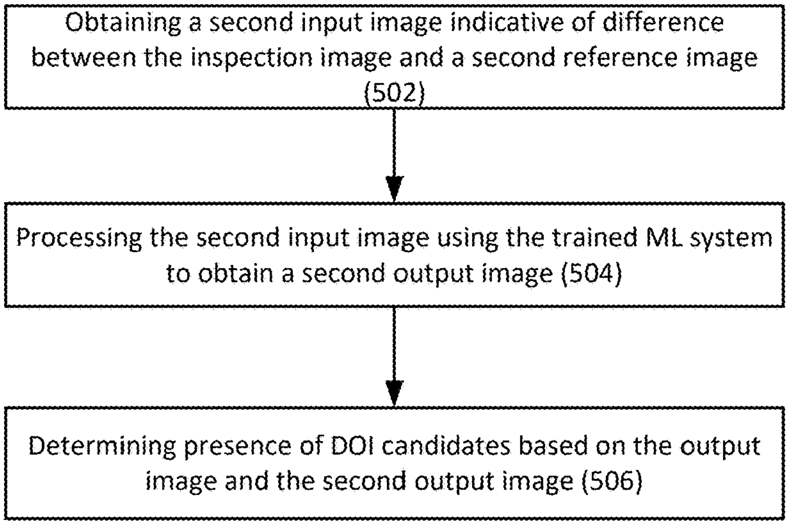
FIG. 5 shows a generalized flowchart of an additional process of runtime defect examination using a second input image in accordance with certain embodiments of the presently disclosed subject matter.

In some cases, more than one reference image can be acquired, and the process described with reference to FIG. 4 can be repeated a plurality of times, so as to obtain a plurality of output images (e.g., defect maps). FIG. 5 illustrates a generalized flowchart of an additional process of runtime defect examination using a second input image in accordance with certain embodiments of the presently disclosed subject matter.

A second input image indicative of difference between the inspection image and a second reference image can be obtained (502). This is in cases where two reference images are acquired for an inspection image. The process of FIG. 4 can be understood as using a first difference image resulting from comparison of the inspection image and the first reference image as the input image. In addition, a second input image can be obtained as a second difference image generated based on the difference between the inspection image and a second reference image, in a similar manner as described with reference to block 402.

The second input image can be processed (504) using the trained ML system to obtain a second output image, in a similar manner as described with reference to block 404. The second output image is representative of a second defect map indicative of distribution of defect of interest (DOI) candidates in the input image. The presence of DOI candidates can be determined (506) based on the output image (i.e., the first output image) and the second output image. By way of example, the two output images can be combined (e.g., by any kind of multiplication or averaging techniques) to a combined output image, which can be used to determine the presence of DOIs. In such ways, the real DOIs are selected as those candidates whose presences are indicated/determined by both output images (e.g., where both images show a strong signal indication of DOI presence). Using multiple input images with the trained ML system can further eliminate residual variations and noises, and enhance detection sensitivity.

Optionally, the ML system can further comprise a classifier. The classifier can be used to process the output image to provide a classification score indicative of level of confidence of DOI presence in the output image, as exemplified in FIG. 6. In such cases, the classification score can be used together with the output image to determine DOI presence. By way of example, only candidates that have a classification score higher than a certain threshold will be determined as DOIs. It is to be noted that the classifier can be also included in the implementation of FIG. 7.

The ML models used in the above embodiments can be implemented with various types of learning models. By way of example, the first ML model can be implemented as an autoencoder. The second and/or third ML models can be implemented as Convolutional Neural Networks (CNNs).

The output image as generated by the ML system can be used for further defect examination (e.g., by the defect examination module 108). Such defect examination can refer to one or more of the following operations: defect detection, defect review, and defect classification.

By way of example, a list of DOI candidates can be further selected from the output image using additional filtering techniques. By way of another example, the DOI candidates can be provided to a defect review tool (such as, e.g., ADR). The review tool is configured to capture review images (typically with higher resolution) at locations of the respective DOI candidates, and review the review images for ascertaining whether a candidate is indeed a DOI. In some cases, a defect classification tool (such as, e.g., ADC) is used in addition to the defect review (DR) tool or in lieu of the DR tool. By way of example, the classification tool can provide class data informative of whether each candidate is a DOI, and for those classified as DOIs, also the classes or the types of the DOIs.

It is to be noted that examples illustrated in the present disclosure, such as, e.g., the exemplified ML models and ML system, the loss functions, the defect examination applications, etc., are illustrated for exemplary purposes, and should not be regarded as limiting the present disclosure in any way. Other appropriate examples/implementations can be used in addition to, or in lieu of the above.

Among advantages of certain embodiments of the presently disclosed subject matter as described herein, is providing a ML system capable of performing defect examination operations based on Fourier transform. The proposed ML system is a learning-based system specifically constructed based on a plurality of ML models, taking advantage of the effects of Fourier transform, in particular the frequency response representation of a DOI in Fourier domain.

The ML system, via various implementations, is capable of not only detecting DOI presence in an input image, but also identifying its exact location. The output image that is reconstructed by the ML system has reduced/suppressed residual noises and variations with respect to the input image, which, when being used for defect detection, significantly improves detection sensitivity.

Among further advantages of certain embodiments of the presently disclosed subject matter as described herein is that the ML system can be used to process multiple input difference images resulting from comparison of an inspection image with multiple reference images. The multiple output images (e.g., multiple defect maps) can be combined and used to determine the presence of DOIs. In such ways, the real DOIs are selected as those candidates whose presences are indicated by the multiple output images. Using multiple input images with the trained ML system can further eliminate residual variations and noises, and enhance detection sensitivity.

It is to be understood that the present disclosure is not limited in its application to the details set forth in the description contained herein or illustrated in the drawings.

In the present detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the present discussions, it is appreciated that throughout the specification discussions utilizing terms such as "obtaining", "examining", "processing", "providing", "training", "using", "generating", "performing", "optimizing", "reconstructing", "detecting", "identifying", "determining", "comparing", "controlling", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the defect detection system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification, are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "defect candidate" used in this specification should be expansively construed to cover a suspected defect location on the specimen which is detected to have relatively high probability of being a defect of interest (DOI). Therefore, a defect candidate, upon being reviewed/tested, may actually be a DOI, or, in some other cases, it may be a nuisance as described above, or random noise that can be caused by different variations (e.g., process variation, color variation, mechanical and electrical variations, etc.) during inspection.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

The term "image(s)" or "image data" used in the specification should be expansively construed to cover any original images/frames of the specimen captured by an examination tool during the fabrication process, derivatives of the captured images/frames obtained by various pre-processing stages, and/or computer-generated synthetic images (in some cases based on design data). Depending on the specific way of scanning (e.g., one-dimensional scan such as line scanning, two-dimensional scan in both x and y directions, or dot scanning at specific spots, etc.), image data can be represented in different formats, such as, e.g., as a gray level profile, a two-dimensional image, or discrete pixels, etc. It is to be noted that in some cases the image data referred to herein can include, in addition to images (e.g., captured images, processed images, etc.), numeric data associated with the images (e.g., metadata, hand-crafted attributes, etc.). It is further noted that images or image data can include data related to a processing step/layer of interest, or a plurality of processing steps/layers of a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the present detailed description, numerous specific details are set forth in order to provide a thorough understanding of the methods and apparatus.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. A computerized system for runtime defect examination on a semiconductor specimen, the system comprising a processing circuitry configured to:

obtain an input image indicative of difference between an inspection image of the specimen and a corresponding reference image; and process the input image using a trained machine learning (ML) system, to generate an output image representative of a defect map indicative of distribution of defect of interest (DOI) candidates in the input image, wherein the ML system comprises a plurality of ML models operatively connected therebetween and previously trained together to perform defect detection on the input image based on Fourier transform, and wherein the output image is usable for further defect examination, and wherein the ML system is trained to detect presence of a DOI in a training image based on a frequency response of a Fourier image corresponding to the training image and a ground truth frequency response of the DOI, and identify a location of the DOI in the training image based on the training image and a reconstructed image of the training image.

2. The computerized system according to claim 1, wherein the ML system comprises a first ML model operatively connected to a second ML model and a third ML model in parallel, wherein the first ML model is configured to generate one or more feature maps representative of the input image, and the second and third ML models are configured to process the one or more feature maps separately and generate, respectively, a real part and an imaginary part of a Fourier image corresponding to the input image.

3. The computerized system according to claim 2, wherein the ML system further comprises an analytical model configured to perform inverse Fourier transform (IFT) on the Fourier image to reconstruct the output image.

4. The computerized system according to claim 2, wherein the first ML model is an auto-encoder, and the second ML model and the third ML model are Convolutional Neural Networks (CNNs).

5. The computerized system according to claim 1, wherein the ML system comprises a first ML model operatively connected to a second model, wherein the first ML model is configured to generate one or more feature maps representative of the input image, and the second model is configured to process the one or more feature maps and reconstruct the output image.

6. The computerized system according to claim 1, wherein the processing circuitry is further configured to:

obtain a second input image indicative of difference between the inspection image and a second reference image;

process the second input image using the trained ML system to obtain a second output image; and determine presence of DOI candidates based on the output image and the second output image.

7. The computerized system according to claim 1, wherein the ML system comprises a classifier, and the processing circuitry is further configured to use the classifier to process the output image to provide a classification score indicative of level of confidence of DOI presence in the output image, and determine DOI presence based on the output image and the classification score.

8. The computerized system according to claim 1, wherein the input image is a difference image obtained by comparing the inspection image with the reference image, and wherein the output image has suppressed residual noises with respect to the input image, which, when being used for further defect examination, improves detection sensitivity.

9. A non-transitory computer readable storage medium tangibly embodying a program of instructions that, when executed by a computer, cause the computer to perform a method of runtime defect examination on a semiconductor specimen, the method comprising:

obtaining an input image indicative of difference between an inspection image of the specimen and a corresponding reference image; and processing the input image using a trained machine learning (ML) system, to generate an output image representative of a defect map indicative of distribution of defect of interest (DOI) candidates in the input image, wherein the ML system comprises a plurality of ML models operatively connected therebetween and previously trained together to perform defect detection on the input image based on Fourier transform, and wherein the output image is usable for further defect examination, wherein the ML system is trained to detect presence of a DOI in a training image based on a frequency response of a Fourier image corresponding to the training image and a ground truth frequency response of the DOI, and identify a location of the DOI in the training image based on the training image and a reconstructed image of the training image.

10. A method for runtime defect examination on a semiconductor specimen, the method comprising:

obtaining an input image indicative of difference between an inspection image of the specimen and a corresponding reference image; and processing the input image using a trained machine learning (ML) system, to generate an output image representative of a defect map indicative of distribution of defect of interest (DOI) candidates in the input image, wherein the ML system comprises a plurality of ML models operatively connected therebetween and previously trained together to perform defect detection on the input image based on Fourier transform, and wherein the output image is usable for further defect examination, and wherein the ML system is trained to detect presence of a DOI in a training image based on a frequency response of a Fourier image corresponding to the training image and a ground truth frequency response of the DOI, and identify a location of the DOI in the training image based on the training image and a reconstructed image of the training image.

11. The method of claim 10, wherein the ML system comprises a first ML model operatively connected to a second ML model and a third ML model in parallel, wherein the first ML model is configured to generate one or more feature maps representative of the input image, and the second and third ML models are configured to process the one or more feature maps separately and generate, respectively, a real part and an imaginary part of a Fourier image corresponding to the input image.

12. The method of claim 11, wherein the ML system further comprises an analytical model configured to perform inverse Fourier transform (IFT) on the Fourier image to reconstruct the output image.

13. The method of claim 11, wherein the first ML model is an auto-encoder, and the second ML model and the third ML model are Convolutional Neural Networks (CNNs).

14. The method of claim 10, wherein the ML system comprises a first ML model operatively connected to a second model, wherein the first ML model is configured to generate one or more feature maps representative of the input image, and the second model is configured to process the one or more feature maps and reconstruct the output image.

15. The method of claim 10, further comprising:

obtaining a second input image indicative of difference between the inspection image and a second reference image;

processing the second input image using the trained ML system to obtain a second output image; and determining presence of DOI candidates based on the output image and the second output image.

16. The method of claim 10, wherein the ML system comprises a classifier, and the method further comprises using the classifier to process the output image to provide a classification score indicative of level of confidence of DOI presence in the output image, and determining DOI presence based on the output image and the classification score.

17. The method of claim 10, wherein the input image is a difference image obtained by comparing the inspection image with the reference image, and wherein the output image has suppressed residual noises with respect to the input image, which, when being used for further defect examination, improves detection sensitivity.

* * * * *